United States Patent
Takashima et al.

(10) Patent No.: US 11,223,805 B2
(45) Date of Patent: Jan. 11, 2022

(54) METHODS AND APPARATUS FOR ANGULAR AND SPATIAL MODULATION OF LIGHT

(71) Applicant: Arizona Board of Regents on Behalf of the University of Arizona, Tucson, AZ (US)

(72) Inventors: Yuzuru Takashima, Tucson, AZ (US); Brandon Hellman, Tucson, AZ (US); Braden Smith, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 92 days.

(21) Appl. No.: 16/604,804

(22) PCT Filed: Apr. 13, 2018

(86) PCT No.: PCT/US2018/027620
§ 371 (c)(1),
(2) Date: Oct. 11, 2019

(87) PCT Pub. No.: WO2018/191694
PCT Pub. Date: Oct. 18, 2018

(65) Prior Publication Data
US 2021/0144347 A1    May 13, 2021

Related U.S. Application Data

(60) Provisional application No. 62/485,579, filed on Apr. 14, 2017.

(51) Int. Cl.
*H04N 9/31*    (2006.01)
*G02B 26/08*   (2006.01)
(Continued)

(52) U.S. Cl.
CPC ....... *H04N 9/3152* (2013.01); *G02B 26/0833* (2013.01); *G02F 1/135* (2013.01);
(Continued)

(58) Field of Classification Search
None
See application file for complete search history.

(56) References Cited

U.S. PATENT DOCUMENTS 6,707,591 B2    3/2004   Amm
7,459,333 B2    12/2008  Richards et al.
(Continued)

FOREIGN PATENT DOCUMENTS

WO    2017115076    7/2017
WO    2017115081    7/2017
(Continued)

OTHER PUBLICATIONS

International Search Report and Written Opinion for International Application No. PCT/US2018/027620 dated Jun. 27, 2018; 11 pages.
(Continued)

*Primary Examiner* — Ashok Patel
(74) *Attorney, Agent, or Firm* — George McGuire

(57) ABSTRACT

A light projection system including a light source, a light controller optically and/or electrically coupled to the light source to generate a plurality of spatially-separated and independently-modulatable beams of light, and an angular light modulator (ALM) positioned to receive the beams of light and selectively direct the light from each beam into one of a plurality of directions. The light source can include a laser diode array. The light controller can be a spatial light modulator or a processor programmed to control an output of each of the lasers of the laser diode array. The angular light modulator may be a digital micromirror device (DMD).
(Continued)

The ALM may be configured to project the images into corresponding diffraction orders of the ALM or the ALM may be configured to continuously scan the images.

25 Claims, 15 Drawing Sheets

(51) Int. Cl.
  *G02F 1/1333* (2006.01)
  *G02F 1/1335* (2006.01)
  *G02F 1/13357* (2006.01)
  *G02F 1/135* (2006.01)

(52) U.S. Cl.
  CPC .. *G02F 1/133348* (2013.01); *G02F 1/133504* (2013.01); *G02F 1/133606* (2013.01); *H04N 9/3161* (2013.01); *H04N 9/3164* (2013.01)

(56) References Cited

U.S. PATENT DOCUMENTS

| | | | |
|---|---|---|---|
| 8,660,154 | B1 | 2/2014 | Strong |
| 2001/0010536 | A1 | 8/2001 | Katzir et al. |
| 2002/0079432 | A1 | 6/2002 | Lee et al. |
| 2002/0122595 | A1 | 9/2002 | Crill |
| 2003/0112507 | A1 | 6/2003 | Divelbiss et al. |
| 2004/0080938 | A1 | 4/2004 | Holman et al. |
| 2005/0243439 | A1 | 11/2005 | Tomita et al. |
| 2006/0115923 | A1* | 6/2006 | Richards ............ G02B 26/0841 438/72 |
| 2008/0013052 | A1* | 1/2008 | Van Gorkom ....... H04N 5/7416 353/38 |
| 2009/0021456 | A1 | 1/2009 | Deppe et al. |
| 2010/0014136 | A1 | 1/2010 | Haussler et al. |
| 2010/0053711 | A1 | 3/2010 | Haussler |
| 2010/0157399 | A1 | 6/2010 | Kroll et al. |
| 2010/0296148 | A1 | 11/2010 | Reichelt et al. |
| 2011/0074983 | A1 | 3/2011 | Bush |
| 2011/0181864 | A1 | 7/2011 | Schmitt et al. |
| 2011/0261094 | A1 | 10/2011 | Ruckmongathan |
| 2012/0038892 | A1 | 2/2012 | Kurtz et al. |
| 2012/0038903 | A1 | 2/2012 | Weimer et al. |
| 2013/0182239 | A1 | 7/2013 | Kaiser et al. |
| 2014/0240514 | A1 | 8/2014 | Love et al. |
| 2015/0268479 | A1 | 9/2015 | Woodgate et al. |
| 2016/0033642 | A1 | 2/2016 | Fluckiger |
| 2016/0033757 | A1 | 4/2016 | Kurtz et al. |
| 2016/0261838 | A1* | 9/2016 | Ranieri ................ H04N 9/3129 |
| 2016/0313695 | A1 | 10/2016 | Futterer |
| 2017/0003392 | A1 | 1/2017 | Bartlett et al. |
| 2017/0018214 | A1 | 1/2017 | Black et al. |
| 2017/0018215 | A1 | 1/2017 | Black et al. |
| 2020/0396427 | A1* | 12/2020 | Takashima ............. H04N 9/312 |

FOREIGN PATENT DOCUMENTS

| | | |
|---|---|---|
| WO | 2018191694 | 10/2018 |
| WO | 2018191696 | 10/2018 |

OTHER PUBLICATIONS

Gittard, Shaun D., "Fabrication of microscale medical devices by two-photon polymerization with multiple foci via a spatial light modulator", Oct. 26, 2011, Biomedical Optics Express, vol. 2, No. 11, pp. 3167-3178.

Ozdemir, Aytekin, et al., "Analysis of the focusing crosstalk effects of broadband all-dielectric planar metasurface microlens arrays for ultra-compact optical device applications", Sep. 27, 2018, OSA Continuum, vol. 1, No. 2, pp. 506-520.

\* cited by examiner

DATA CUBE

METHODS AND APPARATUS FOR ANGULAR AND SPATIAL MODULATION OF LIGHT

RELATED APPLICATION

The present application is a national stage application under 35 U.S.C. 371 based on international patent application PCT/US18/27620 filed on Apr. 13, 2018, which relates and claims priority to U.S. Provisional Application No. 62/485,579 filed on Apr. 14, 2017 having a title METHODS AND APPARATUS FOR ANGULAR AND SPATIAL MODULATION OF LIGHT under 35 U.S.C. § 119(e), the substance of each of said applications is hereby incorporated by reference in its entirety.

FIELD

Methods and apparatus to achieve both angular and spatial light modulation.

BACKGROUND

Digital displays, such as TV screens, laptop screens, phone screens and digital projectors all create images in a pixel-by-pixel manner in a single plane using a Spatial Light Modulator (SLM). SLMs take various forms, such as liquid crystal devices or Liquid Crystal on Silicon (LCoS) devices or nematic liquid crystal devices. For each SLM, a plane is divided into data channels (also referred to herein as SLM pixels), which control the brightness of light emerging from each pixel.

Commonly, a display provides images of different colors (e.g., red, green and blue) which are separately modulated and spatially overlapped. Projection of light from the overlapped images results in the formation of a single full-color image.

The Degrees of Freedom (DOF) of an SLM refers to the number of independent data channels available in the device. Conventionally, DOF are determined by the total number of pixels in an SLM. Each pixel is controlled independently of the other pixels, thereby allowing each pixel to take on any brightness level without regard to other pixels. This structure of independent channels allows the SLM to create arbitrary images. FIG. 1 illustrates a data array of brightness levels (i.e., assigned numerical values) having "n" pixels in a first dimension and "m" pixels in a second dimension. The array defines a frame of an image.

The information bandwidth supported by an SLM is limited by the DOF. Increasing the pixel density of an SLM allows more information to be defined in a same area per frame, leading to higher resolution images.

Conventional 3D technology presents an observer with two different images, one for each eye, and relies on parallax associated with the images to generate a 3D effect. Projecting two images in such a manner requires a doubling of the DOF (i.e., the number of independent channels (pixels)).

In 3D movie theaters, two images are simultaneously projected to the screen. Audience members wear "3D glasses" to filter the overlapping images: all right eyes see one image and all left eyes see the other. For example, one technology uses a headset with high frequency electronic shutters to alternate between opening a left eye path and a right eye path while corresponding images are projected on the screen in a manner synchronous with the shutters of the headset. Another technology uses two orthogonal polarizers in a headset which correspond to the two images projected to the screen with orthogonal polarization states. The right eye polarizer prevents left eye images from reaching the right eye, and the left eye polarizer prevents right eye images from reaching the left eye. For such 3D systems, two data arrays of brightness levels define a frame of an image. An example of two such data arrays to be used in a 3D system using polarizers is shown in FIG. 2.

Two or more, two-dimensional data arrays to be processed, in parallel, is referred to as a data cube (schematically shown in FIG. 3).

SUMMARY

According to aspects of the present invention, the inventors have determined numerous systems and methods for projecting images that comprise a data cube, where each image of the cube is projected in a different angular direction.

A pixel of an angular light modulator as described herein refers to a plurality of actuatable elements of the ALM that operate together to achieve a particular result (e.g. to diffract a beam projected thereon).

A first aspect of the invention is directed to a light projection system comprising a light source, a light controller optically or electrically coupled to the light source such that a combination of the light source and the light controller constitutes a first source of a plurality of spatially-separated and independently-modulatable beams of light, and an angular light modulator (ALM) positioned to receive the beams of light and selectively direct the light from each beam into one of a plurality of directions.

The light source may comprise a laser diode array.

In some embodiments, the light controller is a processor programmed to control an output of each of the lasers of the laser diode array. In some embodiments, the light controller comprises a spatial light modulator (SLM).

The angular light modulator may be a digital micromirror device (DMD).

In some embodiments, the light source and the light controller is configured to project an image onto the ALM at a given time. The ALM may be configured to project the image into a single diffraction order of the ALM.

In some embodiments, the light source and the light controller are configured to project a first column of a first image onto a first column of pixels on the ALM at a first time, and a first column of a second image onto to a second column of pixels on the ALM at a second time, and the ALM is configured to project the first column of the first image into a first angle corresponding to an output of the first image and the ALM is configured to project the first column of the second image into a second angle corresponding to an output of the second image. In some such embodiments, the light source and light controller are further configured to project a second column of the first image onto the first column of pixels on the ALM at a third time, and a second column of the second image onto to the second column of pixels on the ALM at a fourth time, and the ALM projects the second column of the first image into a third angle corresponding to an output of the first image and the ALM projects the second column of the second image into a fourth angle corresponding to an output of the second image. The first time and the second time may be a same time. In some embodiments, the first time and the third time are different times, and the second time and the fourth time are different times.

In some embodiments, the selectively directing of the beams of light, is achieved by directing the beams of light into diffraction orders of the DMD. In some embodiments, the selectively directing of the beams of light, is achieved by focusing each of the beams onto a corresponding mirror of the DMD, whereby continuous steering of each beam is achieved.

Another aspect of the invention is directed to a method of projecting light, comprising independently modulating a first plurality of spatially-separated beams of light, projecting each of the first plurality of beams of light onto a different portion of an angular light modulator (ALM), and directing each of the beams of light into a same first direction using the ALM.

In some instances, the step of independently modulating the first plurality of beams of light is achieved using a processor programmed to control an output of an array of light sources. In some instances, the step of independently modulating the first plurality of beams of light is achieved using a spatial light modulator (SLM).

The angular light modulator may be a digital micromirror device (DMD).

The first plurality of beams of light projected on the ALM may constitute a first image.

The ALM may be configured to direct the first image into a single diffraction order of the ALM.

In some instance, the first plurality of beams constitutes a first column of a first image, the step of independently modulating the plurality of spatially-separated beams of light comprises forming a first column of a second image, the step of projecting comprises projecting the first column of the first image onto a first column of pixels on the ALM at a first time, and the first column of the second image onto to a second column of pixels on the ALM at a second time, the first column being different than the second column, and the step of directing comprises directing the first column of the first image into a first angle corresponding to an output of the first image and directing the first column of the second image into a second angle, the first angle and the second angle being different.

In some instances, the step of independently modulating the plurality of spatially-separated beams of light comprises forming a second column of the first image and a second column of the second image, the step of projecting comprises projecting the second column of the first image onto a first column of pixels on the ALM at a third time, and the second column of the second image onto to a second column of pixels on the ALM at a fourth time, and the step of directing comprises directing the second column of the first image into a third angle corresponding to an output of the first image and directing the second column of the second image into a fourth angle corresponding to an output of the second image.

The first time and the second time may be a same time.

In some instances, the first time and the third time are different times, and the second time and the fourth time are different times.

In some instances, the selectively directing of the first plurality of beams of light is achieved by directing the beams of light into diffraction orders of the DMD.

The selectively directing of the beams of light may be achieved by focusing each of the beams onto a corresponding mirror of the DMD, whereby continuous steering of each beam is achieved.

These and other aspects of the present invention will become apparent upon a review of the following detailed description and the claims appended thereto.

DETAILED DESCRIPTION

Aspects of the invention will be further illustrated with reference to the following specific examples. It is understood that these examples are given by way of illustration and are not meant to limit the disclosure or the claims to any particular example.

Figure 4:
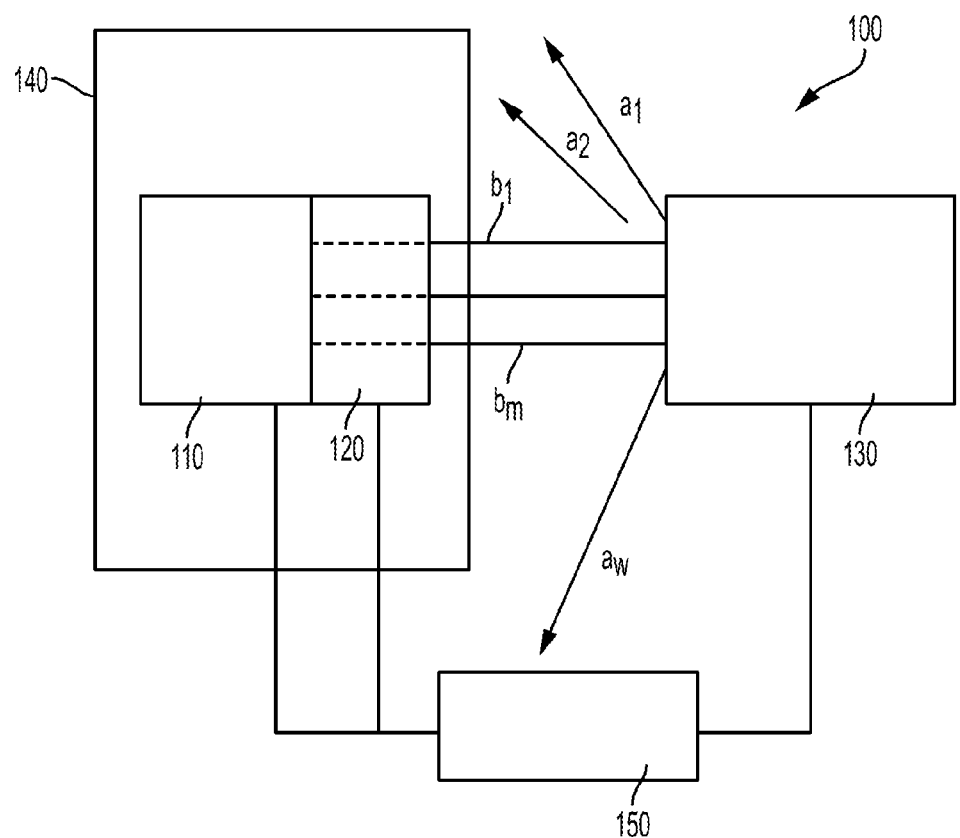
FIG. 4 is a block diagram schematically illustrating an example of a light projection system (also referred to herein as a "projector") according to aspects of the present invention.

FIG. 4 is a block diagram schematically illustrating an example of a light projection system 100 (also referred to herein as a "projector") according to aspects of the present invention. Light projection system 100 comprises a light source 110, a light controller 120, and a spatially-dependent, angular light modulator (ALM) 130. An ALM is a device able to steer a beam incident thereon into a plurality of output angles, at different times. A spatially-dependent ALM includes spatially-separated light directing elements having separate light directing structure (e.g., mechanical movement structures) that may or may not be independently controlled.

Light controller 120 is optically and/or electrically coupled to light source 110, such that a combination of light source 110 and light controller 120 constitutes a first source 140 of a plurality of spatially-separated and independently-modulatable beams of light.

A processor 150 is programmed to control the source 110, light controller 120 and ALM to operate as described herein. Processor 150 and a processor in first source 140 as described above may be the same or different processors.

Light source 110 and light controller 120 each can take several different forms, and can be combined into various embodiments of a first source 140.

Figure 5:
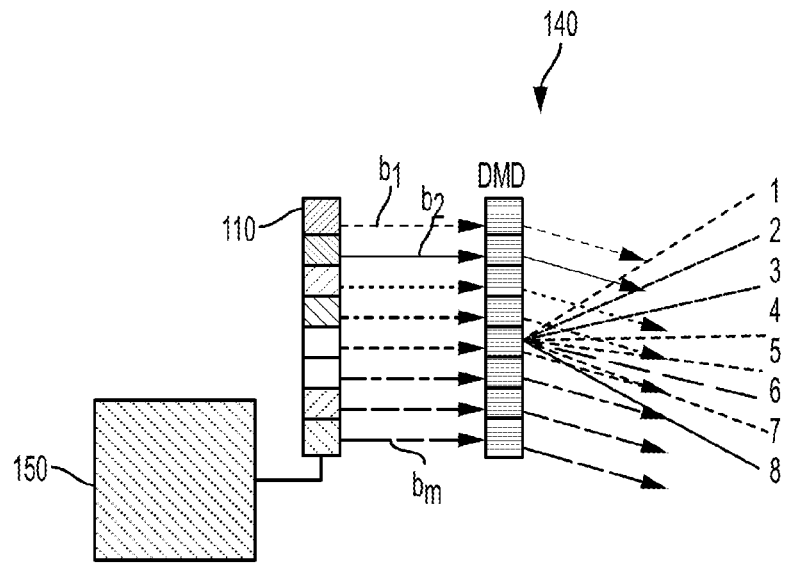
FIG. 5 is a schematic illustration of a projector comprising a light controller and a processor programmed to control the light output from each of the lasers of a light source to generate a plurality of spatially separated beams $b_1, b_2 \ldots b_m$, where only one column is illustrated.

In some embodiments, the light source 110 can comprise an array of light emitting devices (e.g., a two-dimensional array) to produce spatially offset, parallel, collimated beams. In such embodiments, the light source can comprise a plurality of discrete lasers or a laser diode array or a plurality of collimated light emitting diodes (LEDs). In some embodiments, as illustrated in FIG. 5, the light controller 120 may comprise a processor 150 programmed to control the light output from each of the lasers of light source 110, for example, by controlling a current and/or voltage applied to each of the lasers or to control each laser's driver. In some embodiments, each laser emits light of a same wavelength as the other lasers. In FIG. 5 ALM 130 is shown as transmissive for ease of illustration; however, ALM 130 may be transmissive or reflective.

Figure 6:
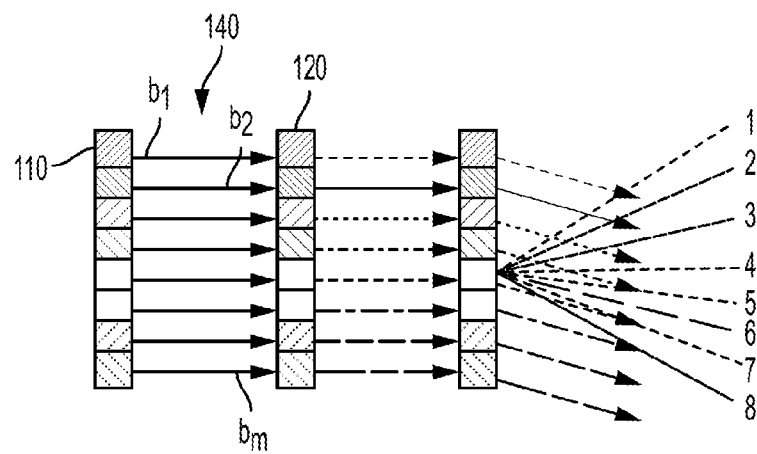
FIG. 6 is a schematic illustration of a projector comprising a light controller beam where the output from each laser of a source is modulated by passing the laser outputs through a spatial light modulator to generate a plurality of spatially separated beams $b_1, b_2 \ldots b_m$, where only one column is illustrated.

Alternatively, in some embodiments, as illustrated in FIG. 6, the beam output from each laser is modulated by passing the laser outputs through a spatial light modulator (SLM) (e.g., a two-dimensional liquid crystal device (LCD), a liquid crystal on silicon (LCoS) device or other known or yet-to-be developed device) controlled by controller 150 to form beams $b_1, b_2 \ldots b_m$. The SLM has a defined spatial distribution to attenuate each beam independently. In some embodiments, each laser emits light of a same wavelength as the other lasers.

Figure 7A:
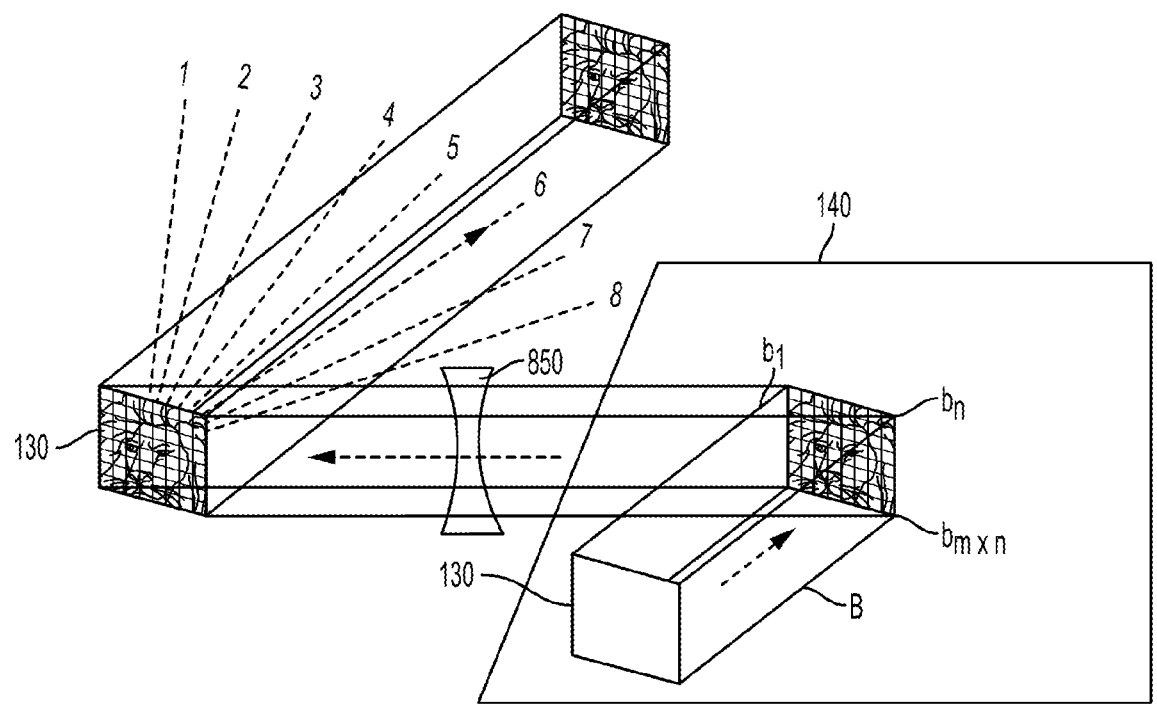
FIG. 7A is a schematic illustration of a projector comprising a light controller having a single expanded beam B used to generate a plurality of spatially separated beams $b_1, b_2 \ldots b_{m \times n}$.

In some embodiments, (as shown in FIG. 7A) a single expanded beam B is produced (e.g., light source 110 comprises a laser beam having an output beam expanded by a conventional beam expander (not shown)). The expanded beam is used to generate light for the plurality of spatially separated beams $b_1, b_2 \ldots b_{m \times n}$. The spatial distribution of the plurality of beams $b_1, b_2 \ldots b_{m \times n}$ is generated, for example, by passing the expanded beam onto or through a light controller 120 comprising a spatial light modulator (SLM) (e.g., an LCD or LCoS device) located such that the expanded beam passes therethrough and each of the plurality of beams $b_1, b_2 \ldots b_{m \times n}$ is formed by pixels of an SLM (i.e., light controller 120). Processor 150 controls the SLM to control the light brightness in each beam $b_1$-$b_n$. In each embodiment, the beams $b_1$-$b_{m \times n}$ are processed by the first light source and projected at the ALM in parallel.

Referring again to FIG. 4, spatially-dependent, angular light modulator 130 is positioned to receive the beams of light $b_1$-$b_m$ (where only one column of beams is shown) and selectively direct the light from all beams into one of a plurality of directions $a_1$-$a_w$.

Two implementations of an ALM 130 to direct light into different angular directions are described in United States provisional patent application 62/485,579 filed Apr. 14, 2017 and PCT patent application having, filed on even date herewith, both having a title SYSTEMS AND METHODS FOR BEAM STEERING USING A MICROMIRROR DEVICE, the substance of both of said applications is hereby incorporated by reference herein in their entireties. In each implementation, an ALM comprising a plurality of actuatable elements is used. The implementations are as follows: (1) a collimated beam is directed at each pixel of a diffractive, spatially-dependent, angular light modulator (e.g., a digital micromirror device (DMD)), the beam diameters are selected to be several actuatable elements (e.g., mirrors in a DMD) wide, such that diffraction of the beams occurs, and the beams can be selectively steered between discrete angles (i.e., diffraction orders) (further details regarding beam steering using implementation (1) are given below), and (2) each beam is focused onto a single actuation element of the ALM (e.g., one mirror of a digital micromirror device (DMD)) or other acutatable mirror device, and steered over a continuously varying angle. Each beam can be steered continuously, and the beam will diverge from its focus point on the mirror (further details regarding beam steering are given below). Either spatially-dependent, angular light modulator implementation may be used in embodiments of the present invention as set forth herein.

Figure 8A:
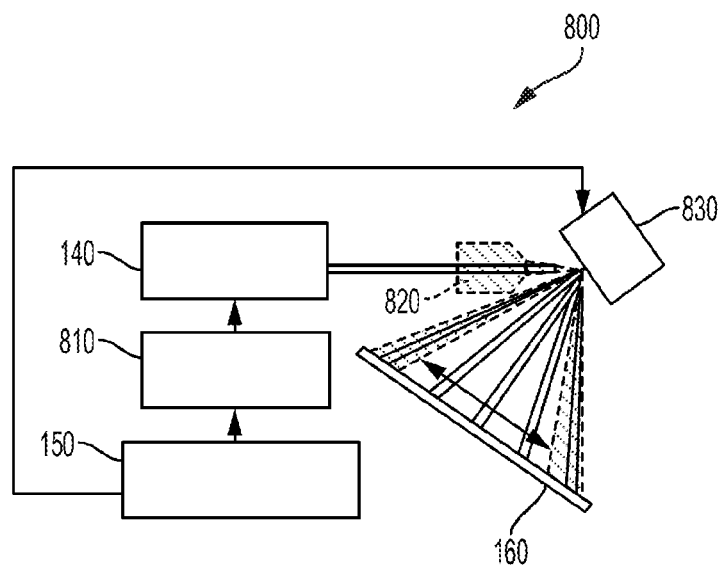
FIG. 8A is a schematic illustration of an example of a projector according to aspects of the present invention.

FIG. 8A is a schematic illustration of an example of a projector 800 according to aspects of the present invention. Projector 800 comprises DMD 800, a first source 140, and a processor 150. As described below, apparatus 800 may include a collimating or focusing lens 1010 (not shown) and/or a delay 810.

Figures 8B, 8C, 8D, 8E:
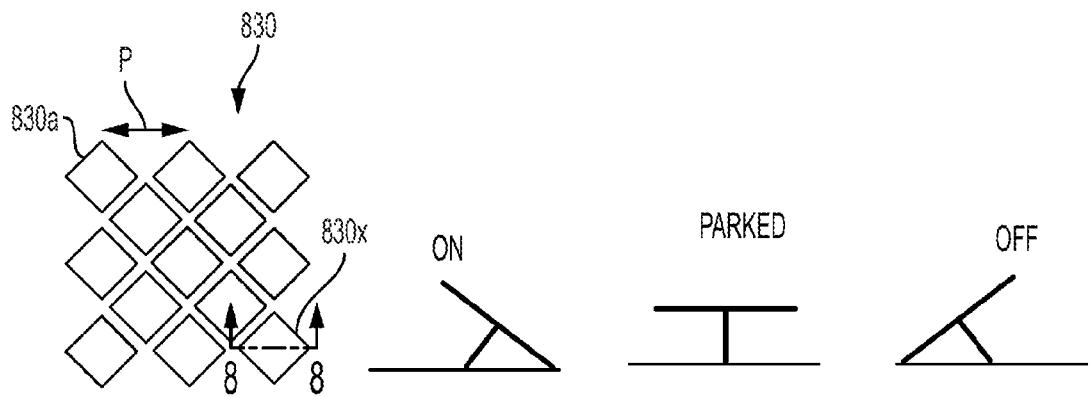
FIG. 8B, is a schematic illustration of a digital micromirror device (DMD) having micromirrors arranged in a diamond orientation.
FIG. 8C-8E is a schematic illustration of a mirror of the DMD of FIG. 8B in various positions.

FIG. 8B is a schematic illustration showing further details of an example DMD 800 suitable for use in the present invention. DMD 800 has micromirror elements 830a-830x (also referred to as micromirrors) having a pitch, p, adapted to impart a modulation on a wavefront incident on the DMD during a transition between a first state and a second state, wherein the DMD has a transition time, T, between the first state and second state. In some embodiments, the first state and the second state correspond to an ON state and an OFF state of a conventional DMD, respectively.

For example, the DMD may comprise a 608×684 array (horizontal by vertical) of micromirrors such as part DLP3000 available from Texas Instruments of Dallas, Tex. As shown in FIG. 8B, the micromirrors may be positioned in a diamond configuration with a pitch of 10.8 μm. In DMD 830, the micromirrors flip between an ON state (shown in FIG. 8C as a viewed along section line 8-8 in FIG. 8B) and an OFF state (shown in FIG. 8E as a viewed along section line 8-8 in FIG. 8B) by rotating +/−12° about an axis defined relative to a normal of a micromirror when in the PARKED position. FIG. 8D shows the DMD in a non-operational PARKED position. It is to be appreciated that the PARKED position is not a typical operational state of the DMD, but rather a transitional position. It is also to be appreciated that, in the illustrated embodiment, a DMD (e.g., DMD 830) is designed for binary spatial light modulation and positions between the ON and OFF states not intended to be used for angular beam steering as described herein.

By another example, the DMD, such as part DLP2010 available from Texas Instruments of Dallas, Tex., may have micromirrors which rotate +/−17° about an axis which is not perpendicular to the normal of the DMD package. In this case, during operation, the micromirrors are never parallel to the DMD package.

In some embodiments, DMD mirrors move continuously between the ON and OFF states with a typical transition time on the order of a few micro seconds. According to some aspects of the invention, a heretofore unused transitional state of the DMD is utilized by projecting a short pulsed laser whose pulse duration is much shorter (e.g., $T/t_{max}$ may be equal to or greater than any of 50, 100, 250) than the transition time of the mirrors. With the short pulsed beam (e.g., beams $b_1$-$b_m$), the micromirror movement can be "frozen" at a plurality of angles between the stationary ON and OFF states. Thus it is feasible to form a programmable blazed diffraction grating to discretely steer a collimated beam (e.g., a laser beam). As described in greater detail below, it is also feasible to create a continuously scanned beam if the laser beam is projected onto a single DMD mirror thereby avoiding the diffraction grating effects caused by using multiple micromirrors to direct a single beam.

The driver for DLP3000 contains an external trigger port that may be used to switch the mirror array between the "ON" and "OFF" states displaying an all-white or all-black bitmap image, respectively. In the illustrated embodiment, both the DMD driver and first source 140 are controlled by a processor 150 (e.g., microcontroller Arduino Uno, Arduino of Italy). The trigger signal sent to first source 140 may be delayed by delay line 810 to synchronize the laser pulse from light source 110 with the movement of the micromirrors in DMD 830.

Figure 8F:
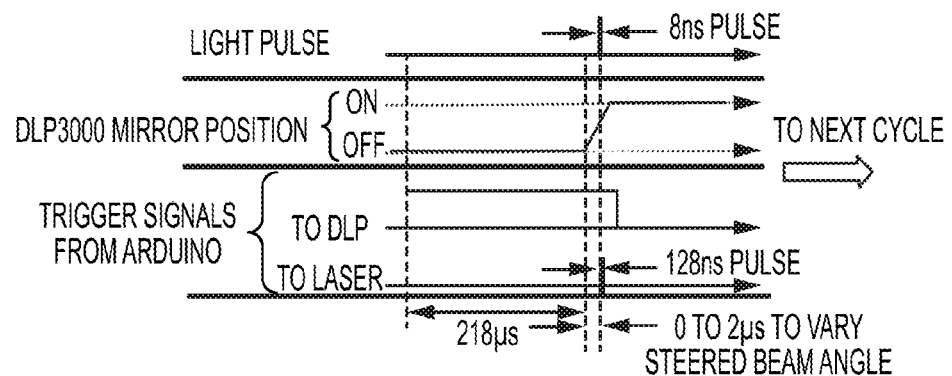
FIG. 8F is an example of a timing diagram for operation of beam steering apparatus.

For example, a desired delay time for the trigger to the first source relative to the trigger input to actuate the micromirrors can be measured experimentally. In one instance, the micromirrors start transitioning about 218 μs after the external trigger pulse is sent to the DMD driver and takes about 2 μs to complete transitioning. An example of a timing diagram for operation of beam steering apparatus 100 is depicted in FIG. 8F. In some embodiments, a serially programmable timing element 810 (e.g., part number DS1023 from Dallas Semiconductor of Dallas, Tex.) between processor 150 and first source 140 is added to provide a programmable delay from 0 to 64 ns in 0.25 ns increments to allow processor 150 to introduce a time delay to the signal sent by processor 150 to first source 120 to finely tune the activation of the micromirrors.

Figure 8G:
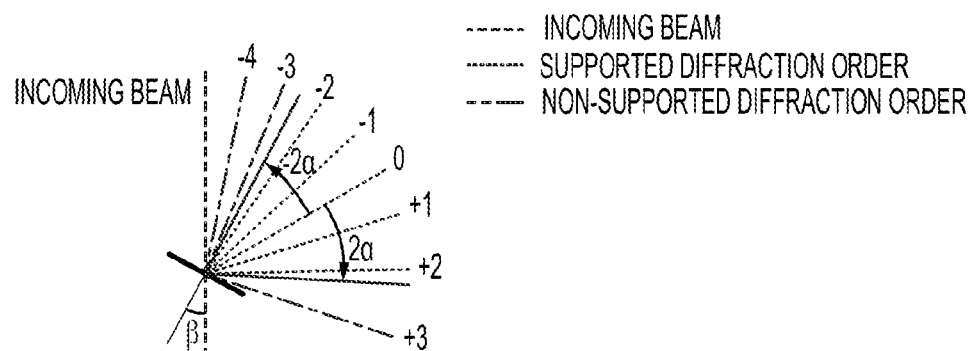
FIG. 8G is a schematic illustration of an incoming beam of light incident on an array of mirrors of a DMD showing generation of a diffraction pattern having various diffraction orders.

As shown in FIG. 8G, an incoming beam of light incident on an array of mirrors as shown in FIG. 8B will generate a diffraction pattern having various orders (e.g., −4, −3, −2, −1, 0, 1, 2, 3, 4).

Figure 8H:
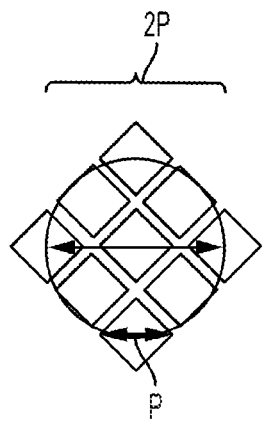
FIG. 8H is a schematic illustration of a DMD having the pitch size p and a beam of selected beam diameter projected thereon.

As shown in FIG. 8H, for the DMD to effectively diffract light in a beam, it is typically desirable that the beam diameter be at least equal to two times the pitch size p. In some embodiments, it is preferable that the beam diameter be at least three times the pitch size p. A group of mirrors positioned to direct a given beam are referred to herein as a pixel of the DMD.

The diffraction orders generated by projecting a beam on an array of mirrors in a manner as described above are defined by the following diffraction grating equation (1):

$$p \sin \theta_m = 2m\lambda \quad (1)$$

where $\theta_m$ is the angle from the zeroth order to the mth order shown in FIG. 8G, p is the mirror pitch (width), λ is the wavelength of light in the beam, and the factor of 2 is due to the diamond micromirror orientation. Eqn. (1) as set forth above is for instances where the angle of incidence of incoming light is normal to the mirror array surfaces. Mirror arrays according to aspects of the present invention may be operated with light projected at any angle with appropriate mathematical consideration.

Figure 8I:
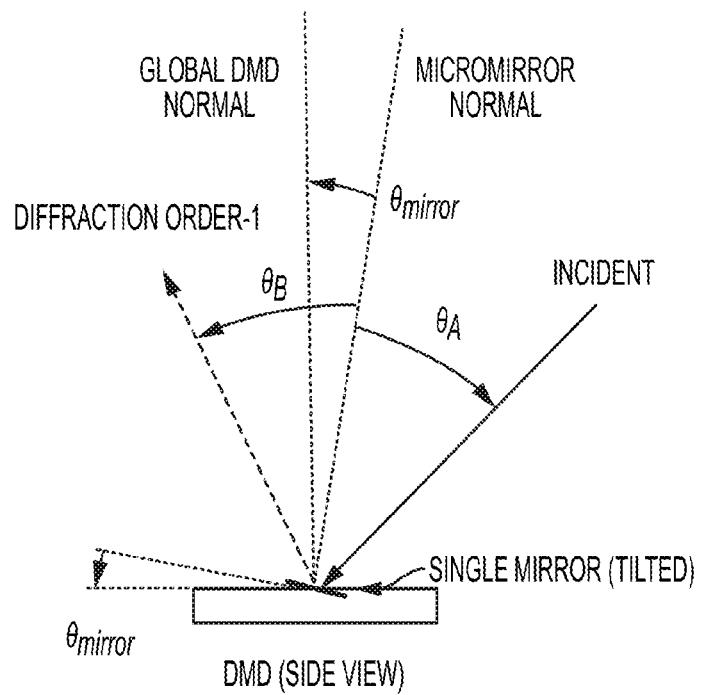
FIG. 8I is a schematic illustration of a DMD having tilted the mirrors in a pixel of the DMD such that the mirrors' normals form an angle $\theta_{mirror}$ relative to the DMD normal angle, to selectively direct light into a given order (e.g., order −1)

As shown in FIG. 8I, by tilting the mirrors in a pixel of the DMD such that the mirrors' normals form an angle $\theta_{mirror}$ relative to the DMD normal (or in the case of DLP2010 relative to the micromirror normal (when the micromirror is located at the midpoint of its transition) and in the plane perpendicular to the axis of rotation and said line), light can be selectively directed into a given order (e.g., order −1). For example, to efficiently direct light into order −1, the mirrors are angled such that $\theta_A = \theta_B$. In some diffractive embodiments, light is diffracted by the DMD into one of the specific diffraction orders with diffraction efficiencies close to 100% since the frozen state of the tilted DMD mirrors is equivalent to a blazed grating where the slope of the mirror is set to the blaze angle. It will be appreciated that for the DLP2010 the blaze angle is not exactly equal to $\theta_{mirror}$, but calculated using $\theta_{mirror}$ and the DLP geometry.

It will be appreciated that, although the illustrated embodiment has a diamond any suitable orientation may be used. Additionally, mirrors of any suitable shape may be used (e.g., square or rectangle). It will be appreciated that other mirror array shapes and orientations are governed by an equation similar to equation (1), but modified to account for the configuration of the mirror array.

Additionally, although the embodiments above were described with the ALM being a digital micromirror, any actuatable device capable of generating an output therefrom having a same or similar phase map to a DMD may be used. For example, an ALM may be a grating light valve (from Silicon Light Machines of Sunnyvale, Calif.) or a membrane mirror (from Optron Systems, Inc. of Waltham, Mass.) or a linear deformable mirror (from Boston Micromachines of Cambridge, Mass.) or a reflection-type LCOS phase modulator (from Hamamatsu Corporation or Holoeye Photonics AG of Berlin, Del.).

Figure 9A:
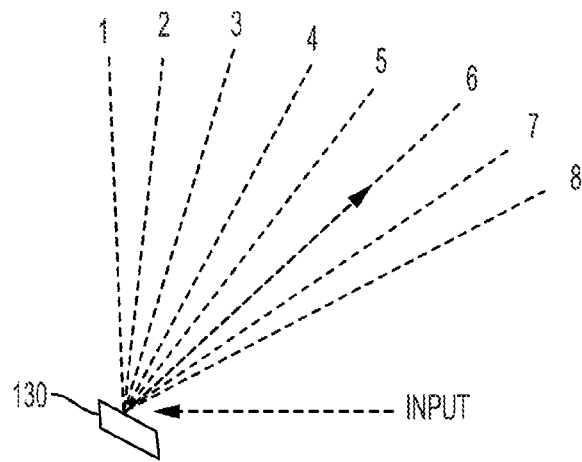
FIG. 9A, illustrates that an ALM can be used to direct each input beam in a selected direction corresponding to a diffraction order.
Figure 9B:
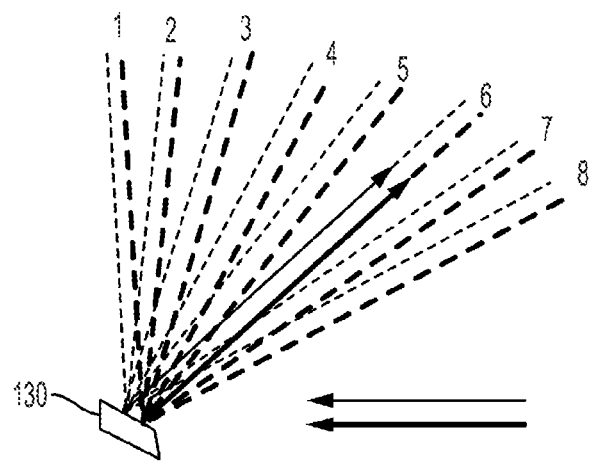
FIG. 9B schematically illustrates the principle that a plurality of spatially offset, parallel, collimated beams can be simultaneously steered in a same direction using different regions of a spatially-dependent, angular light modulator (i.e., two ALM pixels) to direct the beams into a same diffraction order of the ALM.

As shown in FIG. 9A, an ALM can be used to direct each input beam $b_i$ (shown in FIG. 4) in a selected direction $a_1$, $a_2$ ... $a_w$ (shown in FIG. 4) (e.g., into selected diffraction orders). Some embodiments of the invention employ a principle as illustrated in FIG. 9B. According to this principle, two spatially offset, parallel, collimated beams can be steered in a same direction using different regions (i.e., different pixels) of a spatially-dependent, angular light modulator.

It will be appreciated that, if the amplitudes/brightnesses of each input beam is modulated independently, the beams can define different brightnesses at given offset locations in a given direction. It will be further appreciated that a two-dimensional array of offset, parallel, collimated beams may be used, and the brightness distribution of the offset beams would be preserved such that an image (defined by an array of beams from first source 140) can be projected in a particular direction. Accordingly, an image can be projected in the given direction. Typically, each pixel of the SLM is configured to direct a beam into a same diffraction order to project a single image in the diffraction order.

Figure 10A:
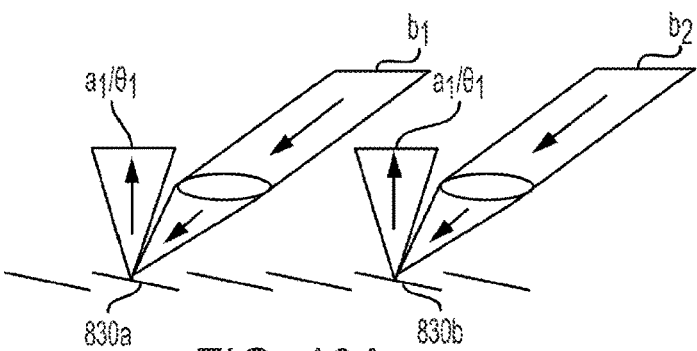
FIGS. 10A and 10B is a schematic side view of one row of a two-dimensional array of lenses of an example of a projection system configured to be operated using continuous tilting of DMD mirrors.
Figure 10B:
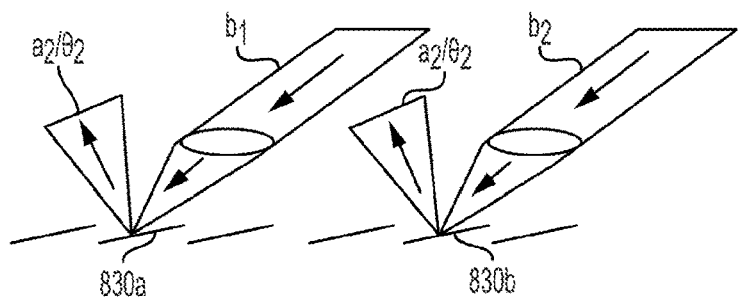

Examples of embodiments of apparatus for achieving implementation (2) are now discussed with reference to FIGS. 10A-10D. FIGS. 10A and 10B show a schematic side view of one row of a two-dimensional array of lenses (including lenses 1010a and 1010b) of a first example projection system configured to be operated to project images using mirrors of a DMD operated using a continuous tilting (i.e., not diffraction into orders of the mirror array) in a first direction $\theta_1$ and a second direction $\theta_2$, respectively. In this embodiment, a pixel of the DMD corresponds to a single mirror 830a or 830b. A plurality of lenses 1010 is configured such that each lens focuses light from a given beam $b_i$ onto a corresponding, single mirror. The light reflected from a given mirror is directed in a direction $a_1$-$a_w$ toward a projection surface or a viewer and all beams of a given image are projected in a same direction. Accordingly, in FIG. 10A, a first image is projected with the mirrors of the DMD at an angle $\theta_1$ (i.e., in a first direction $a_1$) and in FIG. 10B, a second image is projected with the mirrors at a second angle $\theta_2$ (i.e., in a second direction $a_2$). In such a configuration, a pulse of light passes through each lens 1010 only once. Accordingly, such a system is referred to as a single pass system.

Figure 10C:
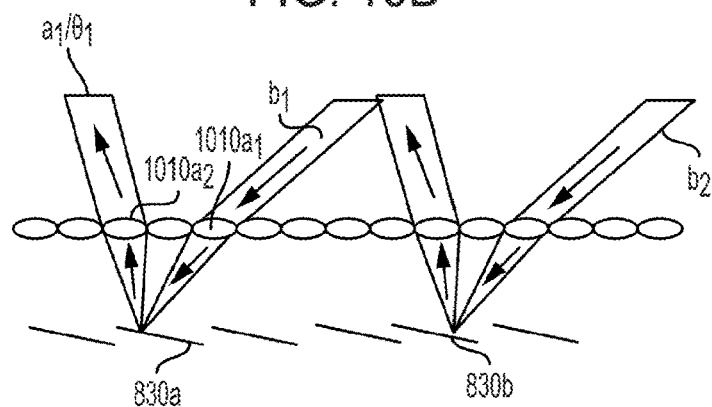
FIGS. 10C and 10D is a schematic side view of one row of a two-dimensional array of lenses of another example of a projection system configured to be operated using continuous tilting of DMD mirrors.
Figure 10D:
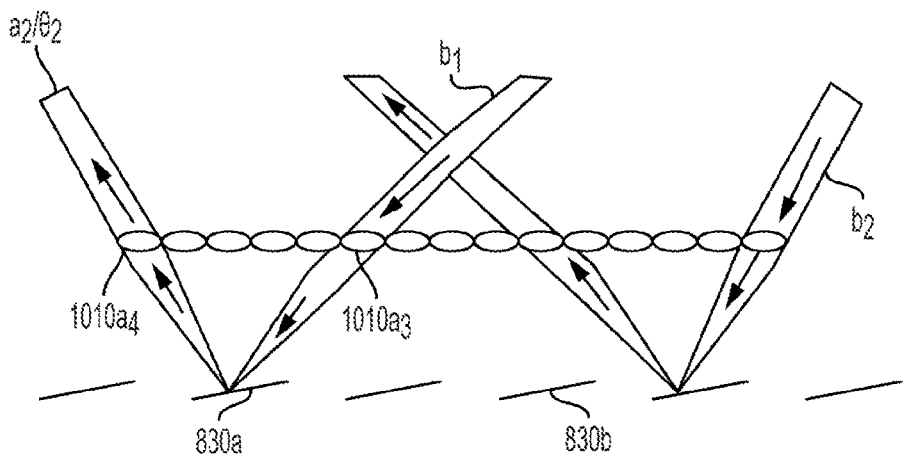

FIGS. 10C and 10D are a schematic side view of one row of a two-dimensional array of a second example of a projection system configured to be operated to project images using mirrors of a DMD that is to be operated using a continuous tilting (i.e., not diffraction into orders of the mirror array). In this embodiment, a pixel of the DMD corresponds to a single mirror 830. A plurality of lenses 1010 is configured such that light in a given beam is focused onto a corresponding, single mirror 830a or 830b by a corresponding first lens $1010a_1$, $1010a_2$. Each mirror 830 has a corresponding second lens $1010a_2$, $1010b_2$ of the plurality of lenses 1010 that is positioned to receive the light of the beam after it reflects from mirror 830 and direct the light in a first direction $a_1$-$a_n$ at a selected angle $\theta_1$-$\theta_n$ toward a first projection surface or a first viewer at a first time, and in a second direction $a_1$-$a_n$ at a selected angle $\theta_1$-$\theta_n$ toward a second projection surface or a second viewer at a second time. Each first lens $1010a_1$ is located so that its corresponding mirror is disposed at a distance equal to the first lens's focal length from the mirror; and each second lens $1010a_2$ is located so that its corresponding mirror 830a is disposed at distance equal to the second lens's focal length from the mirror such that the light sent toward the viewer or projection surface at angle $\theta_1$ is collimated. Each mirror operates similarly to project light at a second angle $\theta_2$ using two different lenses than those used to project at first angle $\theta_1$.

Figure 7B:
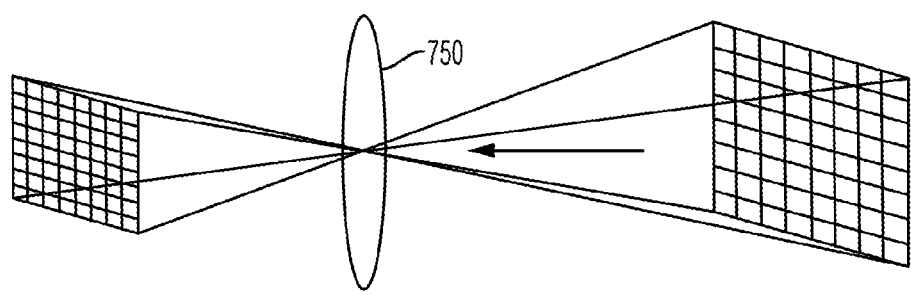
FIG. 7B is a schematic illustration of a portion of a projector having a beam shaping lens disposed between a spatial modulating device and angular modulating device to match beams $b_1, b_2 \ldots b_{m \times n}$ with pixels of angular light modulator (ALM)

In some embodiments, one or more beam shaping lenses 750 is disposed between the spatial modulating device 120 and angular modulating device 130 to match beams $b_i$ with pixels of angular light modulator (ALM). As shown in FIG. 7B, a lens 750 may be used to project beams $b_i$ to corresponding pixels along a column of an ALM.

Referring again to FIG. 4, a projector comprising an SLM to project light onto an ALM as set forth herein is referred to as an angular-spatial light modulator (ASLM). ASLMs as set forth herein are capable of projecting each of a plurality of different images of an image cube along different output angles. When a projector is used for visualization purposes, images of an data cube are, typically, projected within one integration time of a human eye. Set forth below are further examples of systems where images of an image cube are projected along respective, different angular directions.

"Image Per Angle (IPA)"

Referring to FIGS. 11A-11B and 12A-12C, a projector 1100 has a first source 140 (shown in FIG. 4), an ALM (as described above). First source 140 is configured to modulate light beams to produce a sequence of images. In projector 1100, ALM 130 (shown in FIG. 4) is synchronized with first source 140 such that all beams $b_1$, $b_2$ ... $b_{m \times n}$ in each of the images of a sequence is directed into a corresponding one of a plurality of angles/directions (e.g., one of diffraction orders labeled as 1-8 in FIGS. 12A-12B). It will be appreciated that the images present in one iteration through the angles defines a data cube 1300, referred to herein as an Image-Per-Angle data cube (shown in FIG. 13).

Plurality of beams $b_1$, $b_2$ ... $b_{m \times n}$ may, for example, be generated using a single expanded beam directed onto an SLM, as described above with reference to FIG. 7A; however, an array of beams can be generated by a light source and SLM using any of a number of techniques and projected onto the ALM such as described with reference to FIG. 4. It is to be appreciated that, in some embodiments according to this aspect of the invention, as show in FIG. 7A, the images are fully defined before being steered into a particular direction by the ALM.

In embodiments according to this aspect of the invention, projector 1100 is configured to project a single image along each of a plurality of angles, the angles being determined by the diffraction orders (e.g., illustrated as 1-8 in FIGS. 12A-12D) generated by ALM 130. The images projected into the various angles may be same or different than one another.

Figures 11A, 11B:
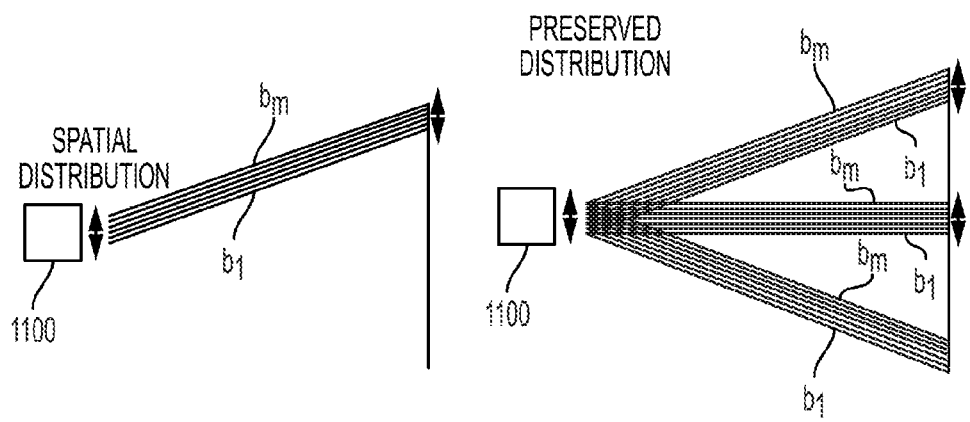
FIGS. 11A-11B and 12A-12B are schematic illustrations of a projector configured to produce images at various angles by synchronizing a first source with an ALM such that all beams in each of the images are directed into a corresponding one of a plurality of angles/directions (referred to herein as an image-per-angle projection system)

In such embodiments of IPA systems, the principle that a plurality of spatially offset, parallel, collimated beams can be simultaneously steered in a same direction using different regions of a spatially-dependent, angular light modulator (i.e., an ALM pixel) to direct the beams into a same diffraction order of the ALM (illustrated in FIGS. 9B and 11*a*). In such embodiments, a projector 1100 comprises a first source 140, as described above with reference to FIG. 4, to project a plurality of spatially-separated beams $b_1$, $b_2 \ldots b_{m \times n}$ onto an ALM 130 which in turn projects each image in a direction corresponding a given diffraction order as describe above with reference to FIG. 9B.

In other embodiments of IPA systems, each beam is focused onto a single actuation element of the ALM (e.g., one mirror of a digital micromirror device (DMD)) and steered over a continuously varying angle, as described above (e.g., with reference to FIGS. 10A-10D).

It is also to be appreciated that, after being projected onto ALM 130, light at all points across a spatial distribution generated by a first source 140 is caused to travel in a same direction using a diffraction order or continuous scanning. Although this process creates a real image in each direction, since all rays are in the same direction, an observer viewing upstream the light projected in the diffraction order, will only observe a point source. This result occurs because the beam directed to the observer is collimated. The light in such a collimated beam may be presented in a form that is viewable to an observer viewing upstream by adding an optical element 850 (shown in FIG. 7A) having positive or negative power in the path of the light. Optical element 850 may be located in any of a number of locations, including between source 110 and SLM 120 or between SLM 120 and ALM 130 (as shown in FIG. 7A) or between ALM 130 and a viewer.

Figure 12A:
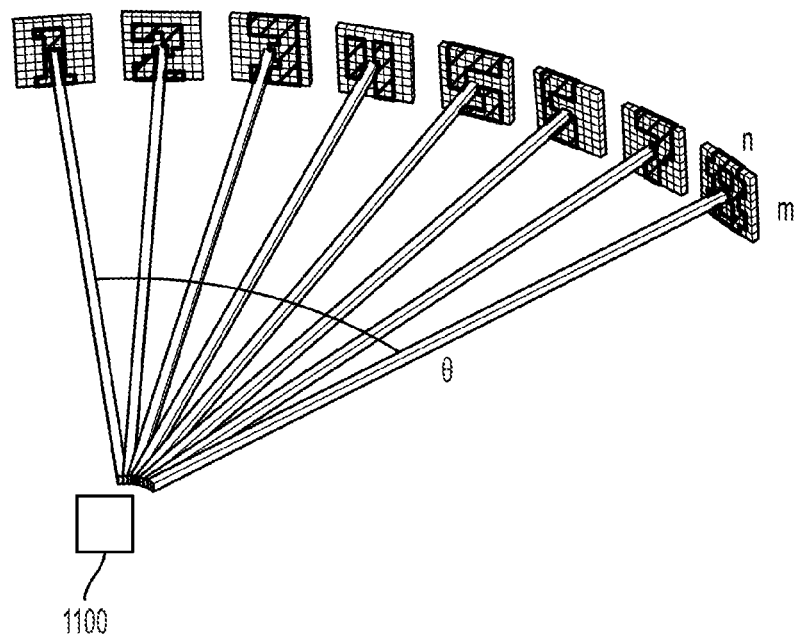
Figure 12B:
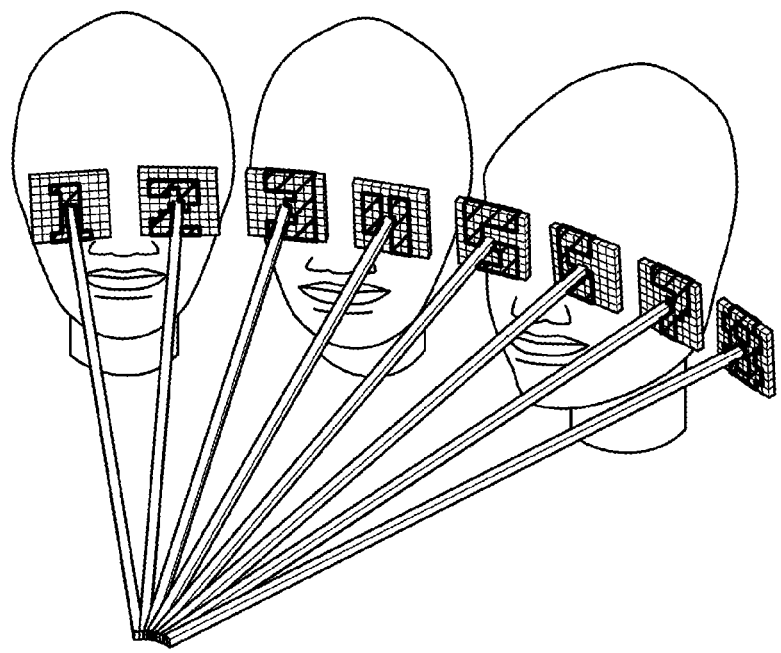
Figure 13:
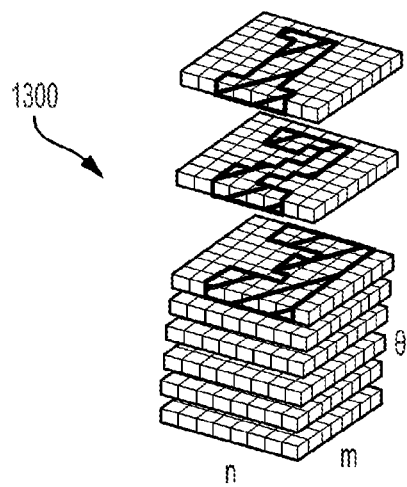
FIG. 13 is a schematic of an image-per-angle data cube.

As shown in FIG. 12B, adjacent images can be images of a same scene from different perspectives such that a viewer of adjacent images perceives the adjacent images as a single 3D image.

Figure 12C:
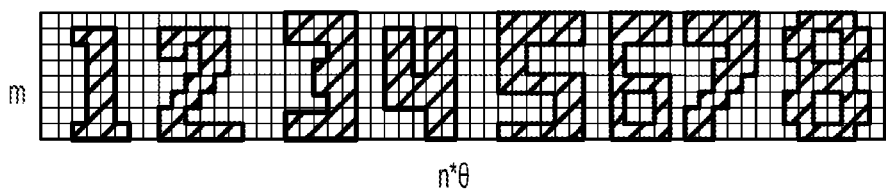
FIG. 12C is a schematic illustration of an image projected using an image per angle projection system where the various angles have sizes selected such that the images abut one another such that the viewer sees one continuous, panoramic image.

As shown in FIG. 12C, an image-per-angle system as described herein can be configured such that the images at the various angles have sizes selected such that the images abut one another such that the viewer sees one continuous, panoramic image (i.e., images 1-8 adjacent to one another) or such a single image can be projected on a display surface as a single panoramic image. It is to be appreciated that if an image-per-angle apparatus having optics configured to project a panoramic image (e.g., the apparatus of FIG. 7A with appropriate magnifications) had the first source 140 replaced by a detector array, the apparatus could operate as panoramic camera.

Figure 14:
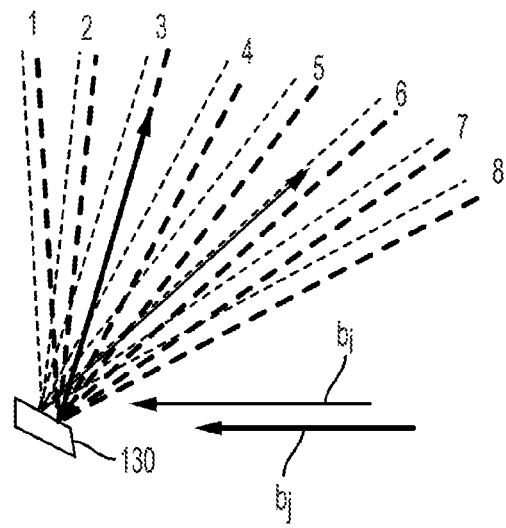
FIG. 14 is a schematic illustration of operation of an example of an image-per-angle projector configured to project a single beam $b_i$ of a first image into a first direction and to project a single beam $b_j$ of a second image into a second direction.

FIG. 14 is a schematic illustration of operation of a projector 100 (shown in FIG. 4) where first source 140 (shown in FIG. 4) is configured to project a single beam $b_i$ of a first image (or a subset of the beams $b_1, b_2 \ldots b_{m \times n}$ constituting an entire image) into a first direction (e.g., corresponding to diffraction order 3) and to project a single beam $b_j$ of a second image (or a subset of the beams constituting an entire second image) into a second direction (e.g., in the illustration, corresponding to diffraction order 6). By timing the emission of the beams $b_1$-$b_{m \times n}$ from source 140, such that they occur at different times during a single cycle (e.g., a single transition from an ON state to an OFF state in a digital micromirror), the image in the first direction and the second direction can be updated at selected locations within an image. It will be appreciated that such a configuration may be useful, for example, when images in directions (e.g., 1-8) are projected using a data compression scheme.

Figure 15:
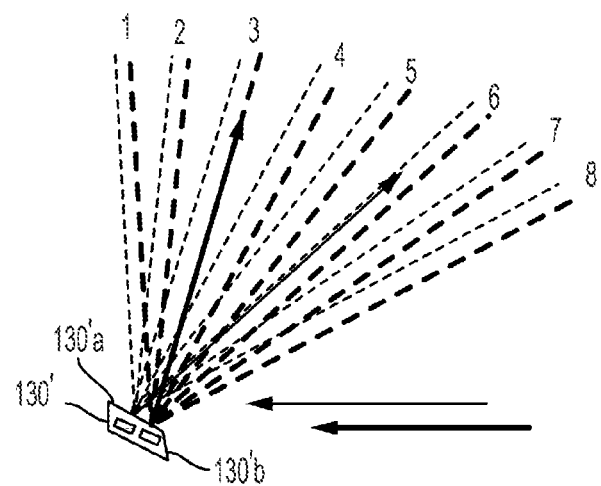
FIG. 15 is a schematic illustration of operation of another example of an image-per-angle projector configured to project a single beam $b_i$ of a first image into a first direction and to project a single beam $b_j$ of a second image into a second direction.

FIG. 15 is a schematic illustration of the operation of a projector 100 (shown in FIG. 4) where first source 140 (shown in FIG. 4) is configured to project a single beam $b_i$ of a first image (or a subset of the beams constituting an entire image) into a first direction (e.g., corresponding to diffraction order 3 in the illustration) and to project a single beam $b_j$ of a second image (or a subset of the beams constituting an entire second image) into a second direction (e.g., corresponding to diffraction order 6 in the illustration) using an alternative technique to that discussed above with reference to FIG. 14. In the projector of the present technique, different portions of ALM 130' (illustrated as a DMD) are operated with the actuation elements of the first portion 130'*a* delayed in phase relative to the actuation elements of second portion 130'*b* (e.g., the actuatable mirrors of first portion 130'*a* of the DMD are at a different angular state between the ON state and OFF state than the actuatable mirrors of second portion 130'*b* when the illumination occurs). Alternatively, the DMD may be configured such that the actuation elements in the first portion and the second portion have different starting positions (e.g., the actuation elements in the first portion start in a first state (e.g., the ON state) and the actuation elements in the second portion start in a second state (e.g., the OFF state). In such an embodiment, both portions 130'*a* and 130'*b* can be actuated at a first same time, and the beams can be projected onto the first portion and the second portion at a second same time (different than the first same time), and the beam incident on the first portion would be projected in a different direction than the beam incident on the second portion. By operating the mirrors in portions 130'*a* and 130'*b*, as set forth above, a portion of the image in the first direction and a portion of the image in the second direction can be updated at selected locations within an image. It will be appreciated that, similar to the configuration discussed with reference to FIG. 14, such a configuration may be useful, for example, when images in directions (e.g., diffraction orders 1-8) are projected using a data compression scheme.

"Image Per Column (IPC)"

Figure 16:
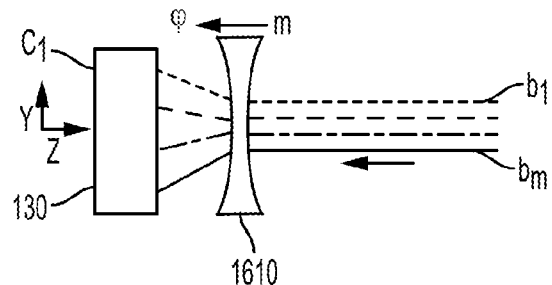
FIGS. 16, 18 and 19 are schematic illustrations of the operation of one column of an ALM of a projector configured to produce a single image by sequentially projecting all columns of one image from a data cube onto a corresponding column of an ALM and varying the direction of projection of light from said corresponding column to create one projected image. Multiple columns of the ALM can be used to produce a plurality of output images (referred to herein as an image-per-column projection system)

In some embodiments, each image in a data cube is projected by generating a sequence of columns $k_1$-$k_s$ of independently modulated beams $b_1, b_2 \ldots b_m$ onto an ALM 130 (shown in FIG. 16). At a given time, each column $c_1$, $c_2 \ldots c_z$ of the ALM projects light corresponding to a column of pixels $k_1$-$k_s$ in an image of a data cube (shown in FIG. 17A). The beams $b_1, b_2 \ldots b_m$ may be generated by first source 140 as described above. The columns of the various images (e.g., images 1-8) may be simultaneously (shown in FIGS. 17B and 17C) or sequentially projected onto the ALM (and directed to a viewer by the ALM). Although 8 images are projected in the illustrated embodiment, any suitable number of images may be projected.

Figure 17A:
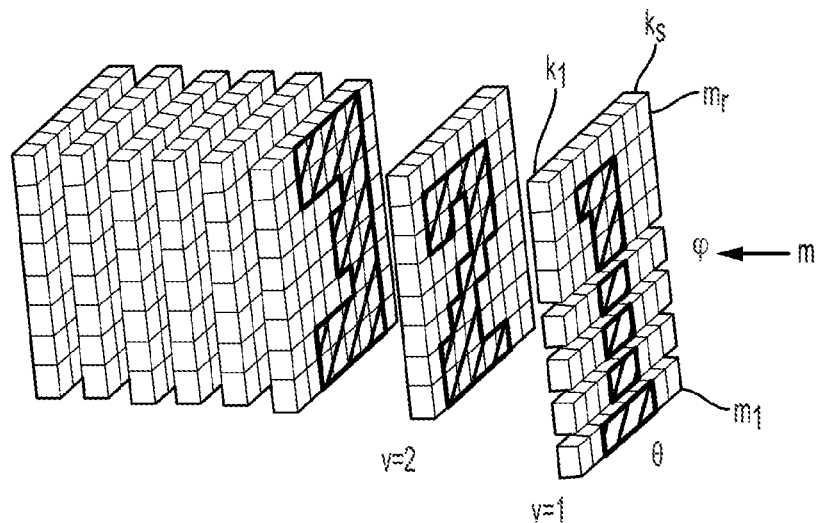
FIG. 17A is a schematic of an image-per-column data cube.
Figure 17B:
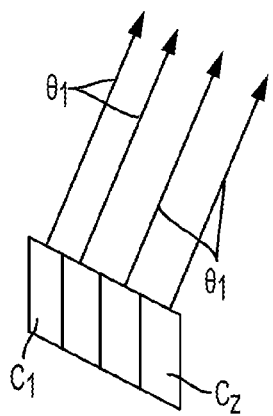
FIGS. 17B and 17C are schematic illustrations of the operation of multiple columns of an ALM of an image-per-column projector where all columns project at a first angle at a first time and all columns projects at a second angle at a second time, respectively.
Figure 17C:
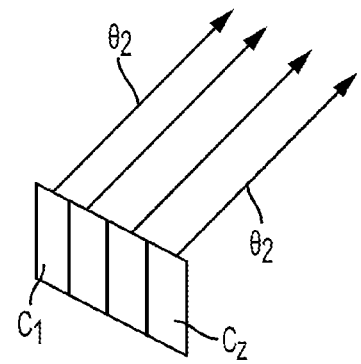
Figure 18:
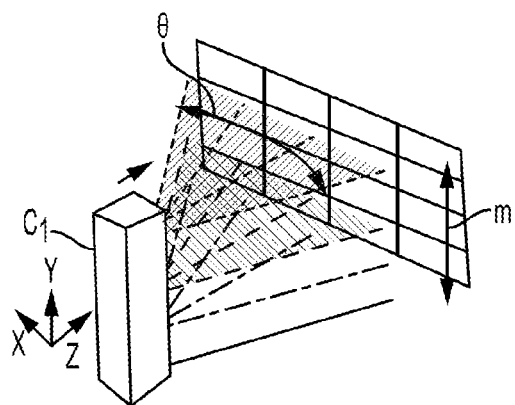
Figure 19:
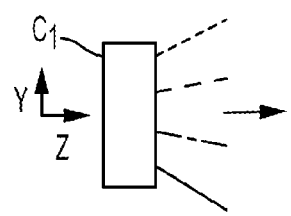

Each column of pixels $c_1$-$c_z$ of actuatable elements on the ALM receives a corresponding column of beams $b_1, b_2 \ldots b_m$. As shown in FIG. 18, each pixel in a column of the ALM is configured to scan across the angular space θ as the sequential columns of beams $b_1, b_2 \ldots b_m$ corresponding to columns $k_1$-$k_s$ are projected onto a column of pixels $c_1$, $c_2 \ldots c_z$, thereby projecting the light in each row $m_1$-$m_r$ in an entire final image (e.g., images 1-8). As shown in FIGS. 17B and 17C, each image (images 1-8) is projected by a corresponding column $c_1$-$c_z$.

Figure 1:
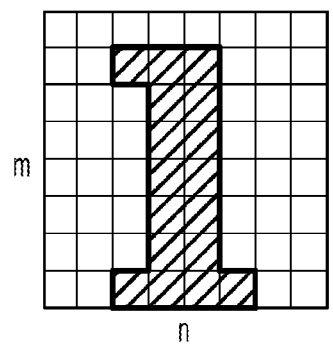
FIG. 1 illustrates a data array of brightness levels.
Figure 2:
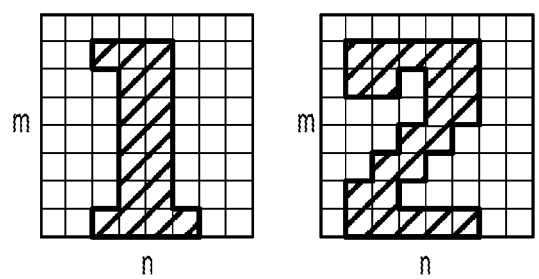
FIG. 2 two data arrays of brightness levels defining a frame of a 3D image.
Figure 3:
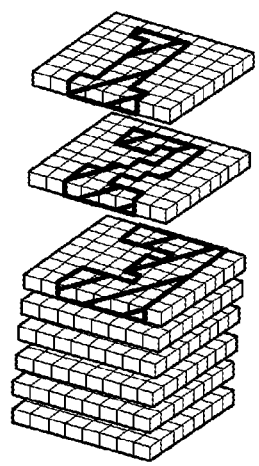
FIG. 3 is a data cube of two-dimensional data arrays.

Referring to FIGS. 4 and 18, source 140 (shown in FIG. 1) is configured to modulate light in each beam $b_1$-$b_m$ to produce a sequence of picture segments across angle θ, and the ALM is synchronized with the source 140 so that each of the columns of beams $b_1, b_2 \ldots b_m$ in the sequence can be directed into a different direction along a row of an image. Since columns on the ALM are actuated independently of each other, each column can create an entire image as shown in FIG. 17A (i.e., one of 1-8). By projecting columns of beams $b_1, b_2 \ldots b_m$ corresponding to different images at different columns $c_1, c_2 \ldots c_z$ of pixels on the ALM, different images can be generated by each column on the ALM.

As shown in FIG. 16, a lens 1610 can be added before the ALM in Image-Per-Column operation. The lens can have any or all of three functions: (1) the lens can be used to project beams onto selected pixels of ALM 130; (2) the lens (for example, a cylindrical lens with optical power along the dimension of an ALM column (e.g., $c_1$) can be used to diverge the beams $b_1, b_2 \ldots b_m$ relative to one another in dimension m (shown in FIG. 18) to match the angle of divergence in dimension θ, and (3) the angles of projection θ (shown in FIG. 17B) of light from various columns $c_z$ can be made to differ from one another. It is to be appreciated that, in some embodiments, lens 1610 can comprise multiple lens elements, and the three functionalities described above can be individually tuned by using a combination of rotationally symmetric and/or cylindrical lenses.

The ALM may steer beams $b_1, b_2 \ldots b_m$ in columns using an implementation where the angles are determined by diffraction (i.e., each beam is directed onto a plurality of actuatable elements) as described above or where the light in each beam is projected onto a single mirror whose angle varies continuously (e.g., using a single mirror of a DMD).

It will be appreciated that modulating the output of each beam $b_1$-$b_m$ corresponding to segments $k_1$-$k_s$, and synchronizing the beam steering of the ALM (in directions θ), results in a complete image from each column. The number of columns $c_1$-$c_z$ of pixels of the ALM that project images determines the number of images of the data cube (referred to herein as an Image-Per-Column data cube) projected by a projector 100. The number of beams $b_1, b_2 \ldots b_m$ (and independent pixels in a column on the ALM) corresponds to the number of pixels in a column in each final image. The number of angular locations $k_1$-$k_s$ in the beam steering of the ALM equates to the number of pixels in a row in each final image. From the discussion above, it is to be appreciated that a data cube can be projected using either image-per-angle or image-per-column techniques, although the image formation occurs along different dimensions. In the FIG. 17A, n represents different columns of a DMD, m (transformed to φ) represents different rows of the final image, and θ represents different columns of the final image. The coordinates φ and θ are in angular space.

It will be appreciated that the Image-Per-Angle (IPA) method defines each image in the spatial domain (n and m), while the Image-Per-Column (IPC) method defines each image in the angular domain (θ and φ). A combination is also possible (θ and m), for instance by removing the lens in FIG. 16. The tradeoffs between IPA and IPC include data cube refresh order (defining one full image vs the first column of all images) and object-image geometry (different starting domain for lens transformation, i.e. IPC may be more easily made into a near-eye display).

Figure 20:
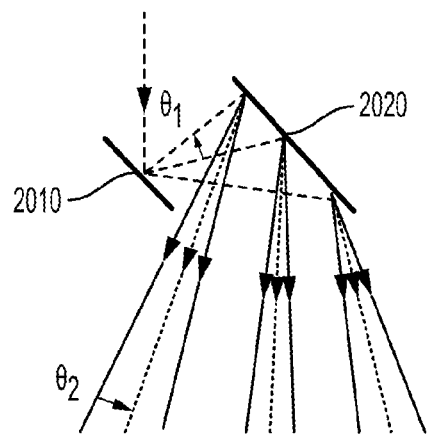
FIG. 20 is a schematic illustration depicting a technique of using multiple, cascaded ALMs to increase the total scan angles.

Another aspect of the invention is directed to increasing the number of diffraction orders produced by an ALM. Any embodiments described above using diffraction orders of an ALM to steer beams of light may have the number of possible directions increased by increasing the number of diffraction orders produced by the ALM. FIG. 20 is a schematic illustration depicting a technique of using multiple, cascaded DMDs as ALM 130 (shown in FIG. 4) in place of a single DMD. As illustrated, the techniques include having two DMDs placed next to each other so that the beam steered from first DMD 2010 is steered onto second DMD 2020. It is to be appreciated that the number of total scan angles resulting from such a configuration is the number of angles of the generated by first DMD 2010 multiplied by the number of scanning angles generated by second DMD 2020.

In the above figure, DMD 2010 first steers the beam into one of three diffraction angles. The angle between these diffraction orders is $θ_1$. This steered beam is then steered again by DMD 2020. In the above figure, the second DMD is also able to steer the beam into one of three diffraction angles. In the above instance, $$\theta_2 = \frac{\theta_1}{3}.$$

But it is also possible to have other configurations. One such configuration is where the DMDs are configured such that $θ_2=3*θ_1$.

Figure 21:
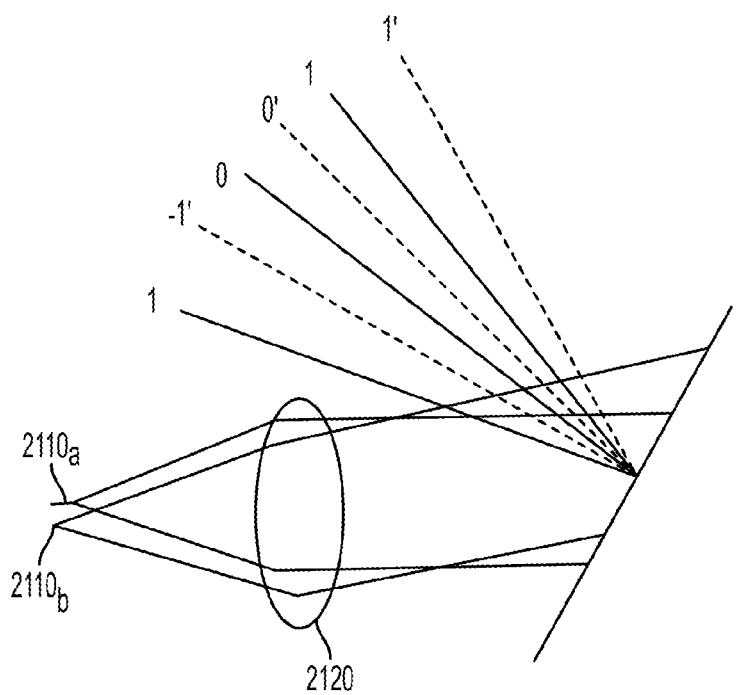
FIG. 21 is a schematic illustration depicting another technique to increase the total scan angles using an array of light sources.

As shown in FIG. 21, an additional technique for increasing the number of directions into which light can be directed applies to embodiment shown in FIG. 7A. If source 110 (i.e., a single laser) were replaced with an array of sources (i.e., an array of lasers represented by lasers 2110a-2210b) (typically of a same wavelength) projecting light at a single collimating lens 2120. The beam from each laser would be projected onto ALM 130 at a different angle than other sources in the array, thereby resulting in light being projected at additional angles −1 to 1' (i.e., spaced at location between the illustrated diffraction orders −1 to 1 in the illustrated embodiment). Alternatively, in some embodiments, each laser in the array has its own collimating lens (not shown), where each collimating lens is arranged to project light at the ALM at a different angle.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A light projection system, comprising:
a light source;
a light controller optically or electrically coupled to the light source, such that the light controller is programed to control the light source to emit a first source of a plurality of spatially-separated and independently-modulatable beams of light; and
an angular light modulator (ALM) positioned to receive the beams of light and selectively direct the light from each beam into one of a plurality of directions, wherein the light source and the light controller are configured to project a first image onto the ALM at a first time and the ALM is configured to project the first image into a single diffraction order of the ALM.

2. The system of claim 1, where the light source comprises a laser diode array.

3. The system of claim 2, wherein the light controller is a processor programmed to control an output of each of the lasers of the laser diode array.

4. The system of claim 1, wherein the light controller comprises a spatial light modulator (SLM).

5. The system of claim 1, wherein the angular light modulator is a digital micromirror device (DMD).

6. The system of claim 1, wherein the light source and the light controller are configured to project an image onto the ALM at a given time.

7. The system of claim 6, wherein the ALM is configured to project the image into a single diffraction order of the ALM.

8. The system of claim 1, wherein the light source and the light controller are configured to project a first column of the first image onto a first column of pixels on the ALM at the first time, and a first column of a second image onto to a second column of pixels on the ALM at a second time, and the ALM is configured to project the first column of the first image into a first angle corresponding to an output of the first image and the ALM is configured to project the first column of the second image into a second angle corresponding to an output of the second image.

9. The system of claim 8, wherein light source and light controller are further configured to project a second column of the first image onto the first column of pixels on the ALM at a third time, and a second column of the second image onto to the second column of pixels on the ALM at a fourth time, and the ALM projects the second column of the first image into a third angle corresponding to an output of the first image and the ALM projects the second column of the second image into a fourth angle corresponding to an output of the second image.

10. The system of claim 8, wherein the first time and the second time are a same time.

11. The system of claim 9, wherein first time and the third time are different times, and the second time and the fourth time are different times.

12. The system of claim 5, wherein the selectively directing of the beams of light, is achieved by directing the beams of light into diffraction orders of the DMD.

13. The system of claim 5, wherein the selectively directing of the beams of light, is achieved by focusing each of the beams onto a corresponding mirror of the DMD, whereby continuous steering of each beam is achieved.

14. A method of projecting light, comprising:
independently modulating a first plurality of spatially-separated beams of light;
projecting each of the first plurality of beams of light onto a different portion of an angular light modulator (ALM) wherein the first plurality of beams of light projected on the ALM constitute a first image; and
directing each of the beams of light into a same first direction using the ALM and wherein the ALM is configured to direct the first image into a single diffraction order of the ALM.

15. The method of claim 14, wherein the step of independently modulating the first plurality of beams of light is achieved using a processor programmed to control an output of an array of light sources.

16. The method of claim 14, wherein the step of independently modulating the first plurality of beams of light is achieved using a spatial light modulator (SLM).

17. The method of claim 14, wherein the angular light modulator is a digital micromirror device (DMD).

18. The method of claim 14, wherein the first plurality of beams of light projected on the ALM constitute a first image.

19. The method of claim 18, wherein the ALM is configured to direct the first image into a single diffraction order of the ALM.

20. The method of claim 14, further comprising:
wherein the first plurality of beams constitute a first column of a first image;
wherein the step of independently modulating the plurality of spatially-separated beams of light comprises forming a first column of a second image;
wherein the step of projecting comprises projecting the first column of the first image onto a first column of pixels on the ALM at a first time, and the first column of the second image onto to a second column of pixels on the ALM at a second time, the first column being different than the second column, and
wherein the step of directing comprises directing the first column of the first image into a first angle corresponding to an output of the first image and directing the first column of the second image into a second angle, the first angle and the second angle being different.

21. The method of claim 20,
wherein the step of independently modulating the plurality of spatially-separated beams of light comprises forming a second column of the first image and a second column of the second image;
wherein the step of projecting comprises projecting the second column of the first image onto a first column of pixels on the ALM at a third time, and the second column of the second image onto to a second column of pixels on the ALM at a fourth time, and
wherein the step of directing comprises directing the second column of the first image into a third angle corresponding to an output of the first image and directing the second column of the second image into a fourth angle corresponding to an output of the second image.

22. The method of claim 20, wherein the first time and the second time are a same time.

23. The method of claim 21, wherein first time and the third time are different times, and the second time and the fourth time are different times.

24. The method of claim 17, wherein the selectively directing of the first plurality of beams of light is achieved by directing the beams of light into diffraction orders of the DMD.

25. The method of claim 17, wherein the selectively directing of the beams of light, is achieved by focusing each of the beams onto a corresponding mirror of the DMD, whereby continuous steering of each beam is achieved.

* * * * *